United States Patent [19]

Cramer et al.

[11] Patent Number: 4,931,207

[45] Date of Patent: Jun. 5, 1990

[54] BLEACHING AND BLUING COMPOSITION AND METHOD

[75] Inventors: Randall J. Cramer, Hayward; Blanca L. Haendler, Livermore, both of Calif.

[73] Assignee: The Clorox Company, Oakland, Calif.

[21] Appl. No.: 220,979

[22] Filed: Jul. 18, 1988

Related U.S. Application Data

[63] Continuation of Ser. No. 89,927, Aug. 25, 1987, abandoned, which is a continuation of Ser. No. 840,974, Mar. 13, 1986, abandoned, which is a continuation of Ser. No. 574,565, Jan. 27, 1984, abandoned.

[51] Int. Cl.[5] .............................................. A01N 59/08

[52] U.S. Cl. ......................... 252/187.26; 252/187.25; 8/108.1; 524/445; 524/522; 524/529

[58] Field of Search ...................... 252/187.25, 187.26; 106/308 M; 524/445, 522, 529; 8/108.1

[56] References Cited

U.S. PATENT DOCUMENTS

| | | | |
|---|---|---|---|
| 3,393,153 | 7/1968 | Zimmerer et al. | 242/95 |
| 3,494,784 | 2/1970 | Coene et al. . | |
| 3,645,911 | 2/1972 | Van Besauw et al. . | |
| 3,663,442 | 5/1972 | Briggs . | |
| 3,666,680 | 5/1972 | Briggs | 252/316 |
| 3,684,722 | 8/1972 | Hynam et al. . | |
| 3,689,421 | 9/1972 | Briggs | 252/95 |
| 3,691,090 | 9/1972 | Kitajima et al. . | |
| 3,701,763 | 10/1972 | Wada et al. . | |
| 3,850,899 | 11/1974 | Wada et al. . | |
| 3,855,178 | 12/1974 | White et al. . | |
| 3,878,037 | 4/1975 | Hansen et al. . | |
| 3,956,165 | 5/1976 | Hansen et al. . | |
| 3,975,280 | 8/1976 | Hachmann et al. . | |
| 3,988,343 | 10/1976 | Lilyquist . | |
| 3,992,317 | 11/1976 | Brichard et al. . | |
| 4,009,139 | 2/1977 | Widder et al. . | |
| 4,049,845 | 9/1977 | Lozier et al. . | |
| 4,058,480 | 11/1977 | Lohmann et al. . | |
| 4,071,463 | 1/1978 | Steinhauer . | |
| 4,072,624 | 2/1978 | Croome et al. . | |
| 4,116,849 | 9/1978 | Leikhim | 252/103 |
| 4,116,851 | 9/1978 | Rupe et al. | 8/108.1 |
| 4,151,104 | 4/1979 | Alvarez et al. | 252/99 |
| 4,174,289 | 11/1979 | Sorgenfrei et al. . | |
| 4,269,740 | 5/1981 | Woods et al. . | |
| 4,271,030 | 6/1981 | Brierley et al. . | |
| 4,334,933 | 6/1983 | Abe et al. . | |
| 4,457,855 | 7/1984 | Sudbury | 252/98 |
| 4,526,700 | 7/1985 | Hensley et al. | 252/102 |

FOREIGN PATENT DOCUMENTS

| | | |
|---|---|---|
| 0009250 | 2/1980 | European Pat. Off. . |
| 60-55100 | 3/1985 | Japan . |
| 1113348 | 5/1968 | Netherlands . |
| 1329086 | 8/1970 | United Kingdom . |
| 1230438 | 5/1971 | United Kingdom . |
| 1384907 | 2/1975 | United Kingdom . |
| 1485643 | 9/1977 | United Kingdom . |
| 1518569 | 7/1978 | United Kingdom . |
| 1564189 | 4/1980 | United Kingdom . |
| 1568836 | 6/1980 | United Kingdom . |
| 1572353 | 7/1980 | United Kingdom . |
| 1574824 | 9/1980 | United Kingdom . |
| 1587210 | 4/1981 | United Kingdom . |
| 1588270 | 4/1981 | United Kingdom . |
| 1596988 | 9/1981 | United Kingdom . |
| 1601083 | 10/1981 | United Kingdom . |

OTHER PUBLICATIONS

Chemical Abstract No. 125941t, vol. 91, Goto et al., Japanese patent Kokai No. 7950510, Apr. 20, 1979.

Findley, W. R., "Whitener Selection for Today's Detergents," J. Amer. Oil Chem. Soc., 60(7), pp. 1367–1369 (Jul. 1983).

*Primary Examiner*—Amelia Burgess Yarbrough

*Attorney, Agent, or Firm*—Majestic, Parsons, Siebert & Hsue

[57] ABSTRACT

Liquid bleaching and coloring compositions are provided in which a polymeric matrix stably suspends pigment particles. A preferred composition includes an aqueous solution having sodium hypochlorite in an amount of from about 3.5 wt. % to about 6.2 wt. %, an anionic or nonionic surfactant in an amount of from about 0.02 wt. % to about 5 wt. %, a polymer in an amount of from about 0.4 wt. % to about 0.6 wt. %, and ultramarine blue particles in an amount of from about 0.1 wt. % to 0.2 wt. %, the ultramarine blue particles being stably suspended and dispersed in the aqueous solution via the polymer.

11 Claims, No Drawings

BLEACHING AND BLUING COMPOSITION AND METHOD

This is a continuation of application Ser. No. 089,927 filed Aug. 25,1987, which is a continuation of application Ser. No. 840,974 filed Mar. 13, 1986, which is a continuation of application Ser. No. 574,565 filed Jan. 27, 1984, all abandoned.

FIELD OF THE INVENTION

The present invention generally relates to liquid compositions useful in treating fabrics, and particularly to liquid bleaching solutions having stably suspended ultramarine blue therein.

BACKGROUND ART

A variety of substantially water insoluble particulates are known and useful in treating fabrics. For example, particulate pigments, such as ultramarine blue, are used to mask the undesirable yellow color of fabrics following laundering. During laundering, if the pigment particles are sufficiently small and are dispersed in the laundry solution, then they become entrained in the fabrics. Thus, for example, ultramarine blue particles can be used to mask the yellowed color of the fabrics by partially compensating for the absorption of short wavelength blue.

Although addition of particulates in conjunction with laundering additives is a convenient means of treating fabrics, it has been difficult to sufficiently stably suspend the particulates, particularly in a strongly oxidizing environment such as hypochlorite bleach, while retaining water dispersibility of the solution.

U.S. Pat. No. 4,271,030, issued Jun. 2, 1981, inventors Brierley et al., discloses a liquid hypochlorite bleach having a particulate pigment, such as ultramarine blue, which is said to be stably suspended in the composition by means of a flocculant, such as calcium soap flocs and amine oxides, filling at least 50% of the volume of the composition; and, U.S. Pat. No. 3,663,442, issued May 16, 1972, inventor Briggs, discloses liquid bleaching compositions having a finely particulate terpolymer which imparts opacity to the compositions.

However, prior known compositions with particulates in aqueous solutions have posed sedimentation, coagulation or stability problems or have not found commercial acceptability as dual bleaching and bluing compositions.

SUMMARY OF THE INVENTION

Accordingly, it is an object of the present invention to provide a simple and efficient method for stably suspending substantially inert and water insoluble particulate agents for treating fabrics in aqueous solutions, particularly bleaching solutions, with the solutions being readily dispersed during laundering to provide both bleaching, as well as coloring or bluing, of the fabrics treated.

Additional objects, advantages, and novel features of the invention will be set forth in part in the description which follows, and in part will become apparent to those skilled in the art on examination.

In one aspect of the present invention, a composition useful for treating fabrics is provided which comprises an aqueous solution, a particulate, and a polymer dispersed in the aqueous solution which forms a matrix in which the particulate is entrapped. The aqueous solution preferably has from about 1 wt. % to about 10 wt. % of a hypochlorite salt, and the polymer is preferably an oxidized polyethylene or a polyethyleneacrylic acid copolymer.

In another aspect of the present invention, a method for producing a bleaching and bluing composition is provided which comprises the steps of admixing a quantity of molten polymer with base, contacting the molten polymer in the presence of an anionic or a nonionic surfactant with an aqueous solution to form an emulsion, dispersing a quantity of particulate ultramarine blue in the emulsion, and adding a water soluble salt, such as sodium hypochlorite, until the emulsion collapses with the polymer forming a matrix in which particles of ultramarine blue are entrapped.

A preferred liquid composition of the invention has sodium hypochlorite in an amount of from about 3.5 wt. % to about 6.2 wt. %, an anionic or nonionic surfactant in an amount of from about 0.02 wt. % to about 5 wt. %, a polymer derived from oxidized polyethylene or polyethylene-acrylic acid copolymer in an amount of from about 0.4 wt. % to about 0.6 wt. %, and ultramarine blue particles in an amount of from about 0.1 wt. % to about 0.2 wt. %. The polymer stably suspends and disperses the ultramarine blue particles in the liquid composition. When the preferred composition is used, as by adding to wash water, then the polymer releases the ultramarine blue particles, which deposit on clothing being washed to mask undesirable yellowing following laundering.

BEST MODE OF CARRYING OUT THE INVENTION

Broadly, the present invention provides liquid compositions which include a dispersed polymer forming a matrix in which substantially water insoluble particles are entrapped. The particles are substantially evenly distributed throughout the composition and are suspended therein by means of the polymer.

Suitable particulates for suspending in compositions of the present invention are substantially inert in the liquid solution, and include various known pigments. For example, suitable pigments include aluminosilicates, such as the ultramarines (red, green, violet and blue), zeolites, and simple metal oxides (such as titanium dioxide and chromium dioxide).

Particulates useful in the present invention are substantially water insoluble and often have a higher density than the aqueous solutions in which they are desirable dispersed for fabric treatment. For example, ultramarine blue has a density of 2.35 g/cc, and ultramarine blue particles begin settling out of aqueous solution within about four hours, even when the particles are of very small size.

Particulate density, however, is not believed to be a critical factor in the present invention, as the inventive compositions do not follow Stokes' law. Thus, particulates suitable for the present invention may have densities which are either higher or lower than the liquid solution. Particle size will generally be from about 0.5 to about 50 micron, preferably from about 0.5 to about 2 microns. Compositions of the invention will typically have relatively low viscosity (about 20 to about 60 centipoise, or 0.02 to 0.06 pascal second), and thus are readily poured or dispensed for use. Preferred compositions have a pH of at least about 11, preferably a pH of at least about 12.5.

Suitable polymers for practice of the present invention form a matrix which is dispersed in an aqueous solution and which entraps the particulate. Preferred polymers are oxidized polyethylenes and polyethyleneacrylic acid copolymers, which have melting points in the range of about 90° C. to about 120° C.

Oxidized polyethylenes suitable for the present invention may vary considerably in structure. One suitable oxidized polyethylene has the general formula shown in FIG. 1, below, where "R" may be hydrogen or alkyl groups. The ether and ester functionalities may be linear (as illustrated by FIG. 1) or be intramolecularly bonded ring structures. The oxidized polyethylenes typically have a molecular weight of about 400 to about 3000 and have acid numbers from about 30 to about 120.

$$HO\overset{\displaystyle O}{\overset{\|}{C}}(CH_2)_x\overset{\displaystyle O}{\overset{\|}{C}}(CH_2)_yO(CH_2)_z\overset{\displaystyle O}{\overset{\|}{C}}OR$$ FIG. 1

Wherein the total of x, y and z is from about 35 to about 250.

Preferred polyethylene-acrylic acid copolymer acids are slightly branched polyethylene chains containing no oxygen functionality other than carboxyl groups, and have the general structure illustrated by FIG. 2, below. Molecular weight is typically from about 500 to about 6000, and the copolymers have acid numbers from about 30 to about 70.

$$R_1\!-\!(CH_2CH_2)_x\!-\!(CH_2\underset{\displaystyle |}{\overset{\displaystyle COOH}{\overset{|}{C}}}H)_y\!-\!R_2$$ FIG. 2 wherein the total of x and y is from about 12 to about 195, $R_1$ may be methyl or carboxyl, and $R_2$ may be methyl or hydrogen.

Preparation of compositions in accordance with the present invention includes forming an emulsion of suitable polymer with an anionic or a nonionic surfactant. The emulsified polymer forms a discontinuous, internal phase which is dispersed in the continuous, external aqueous phase.

Suitable anionic surfactants, or emulsifying agents, include soaps (such as are produced from reacting fatty acids with alkalis or amine compounds), sulfates, sulfonates and phosphates. Suitable nonionic surfactants include polyoxyethylene and polyoxypropylene derivatives, fatty alkanol amides and fatty amine oxides.

The emulsion is preferably prepared by melting the oxidized polyethylene or polyethylene acid copolymer with a solution of the surfactant and with base, and then slowly adding boiling water to the melt. At emulsion inversion point, the viscosity of the composition drops and additional boiling water may be added to adjust the emulsion to a desired weight percent of total solids. A quantity of particulate agent is then dispersed into the emulsion, preferably with the particulate being in a weight ratio with respect to the emulsified polymer of from about 1:2 to about 1:8.

Saponification and/or neutralization of the molten polymer is preformed prior to formation of the emulsion, preferably with elevated pressure. (The oxidized polyethylene is both saponified and neutralized. The polyethylene-acrylic acid copolymer is neturalized.) Smooth addition of boiling water preceding the emulsion inversion point provides a uniform dispersion. Cooling of the emulsion to room temperature is preferably at a rapid rate (by means, for example, of a cooling jacket on the emulsion kettle).

Following preparation of a suitable emulsion, the selected particulate is then admixed, preferably at a mix rate of about 100 to 300 rpm, forming a simple, physical mixture. A water soluble salt is added until the emulsion collapses (due to increased ionic strength of the solution). Addition of the water soluble salt is preferably by slowly adding a hot (about 21° C. to about 38° C.) aqueous solution in which the salt is dissolved, preferably at a mix rate of about 100 to 300 rpm. Further additions of the salt solution may be used following collapse of the emulsion to adjust the final inventive composition to desired solids ranges, and additional surfactant may be added if desired.

Suitable water soluble salts include sodium carbonate, sodium sulfate, sodium chloride, sodium hypochlorite, calcium hypochlorite, calcium chloride, magnesium sulfate, lithium hypochlorite, and aluminum sulfate. Particularly preferred is sodium hypochlorite.

It has been found that the salt should be slowly added into the emulsion. Too rapid addition tends to precipitate polymer in a curd-like form.

The following experimental methods, materials and results are described for purposes of illustrating the present invention. However, other aspects, advantages and modifications within the scope of the invention will be apparent to those skilled in the art to which the invention pertains.

EXPERIMENTAL

Cardipol LPO-25 (available from Bareco Co.) was utilized in preparing embodiments of the invention in which the polymer was an oxidized polyethylene. Cardipol was found to have a relatively low molecular weight, and samples with a range of saponification numbers 52–91 mg KOH/g and melting points 98°–115° C. were used.

Polyethylene-acrylic acid copolymers ("A-C" polyethylenes available from Allied) were found to have higher molecular weights with acid numbers ranging 40–120 mg KOH/g and melting points 92°–108° C.

The water soluble salt was provided by a liquid hypochlorite bleach containing sodium hypochlorite, and the surfactants chosen were stable to hypochlorite. Aqueous solutions of sodium hypochlorite are inherently basic, as sodium hypochlorite is the salt of a weak acid (hypochlorous acid) and a strong base (sodium hydroxide). Since it is well known that hypochlorite ion is stablized by basic solutions, conventional aqueous hypochlorite bleach usually incorporates small amounts of sodium hydroxide or sodium coarbonate, which adjust the solution to a pH of about 10.5 to 12.0. Aqueous hypochlorite bleaches can also include additional components and be of higher pH.

Examples I–VIII illustrate suitable emulsions as precursors in making compositions in accordance with the present invention, and examples VIII and IX illustrate two preferred embodiments.

EXAMPLE I

Into a 1 liter three-neck flask equipped with condensor and mechanical stirrer was placed 100 g Cardipol LPO-25, 83 g sodium lauryl sulfate (30% active solution) and 6.8 g NaOH for saponification and neutralization. The mixture was stirred and heated on an oil bath at 120° C. until the polymer was melted and homogeneous. Boiling water was added in samll portions (about 25 ml) with rapid stirring until there was a drop in viscosity. Additional hot water wad added to bring the volume to 500 ml. The emulsion was allowed to cool to room temperature with stirring, filtered through a cheese cloth and stored.

Preferred ranges for the emulsion are:

% Total solids: 22–25% pH: 11.5–12.0

Viscosity: 20cps (Brookfield, 25° C.)

% Coagulum: less than about 3%

EXAMPLE II

Three compositions (with varying amounts of an anionic surfactant) were prepared in a manner analogous to the preparation of Example I. Component weight percentages of the three emulsions were as follows.

| Components | (a)wt. % | (b)wt. % | (c)wt. % |
|---|---|---|---|
| Polymer (oxidized polyethylene) | 20 | 20 | 20 |
| NaOH | 2 | 2 | 2 |
| sodium dodecyl diphenyl-oxide disulfonate* (45% soln) | 1.1 | 6.6 | 11.1 |
| Water | 75.9 | 70.4 | 65.9 |

*Dowfax 2A1, available from DOW Chemical Co.

EXAMPLE III

Another three emulsion compositions were prepared having the component weight percentages as follows.

| Components | (a)wt. % | (b)wt. % | (c)wt. % |
|---|---|---|---|
| polymer (oxidized polyethylene) | 20 | 20 | 20 |
| NaOH | 2 | 2 | 2 |
| sodium lauryl sulfate* (30% soln) | 10 | 16.6 | 33.3 |
| Water | 67 | 60.4 | 43.7 |

*Equex S, available from Procter & Gamble

EXAMPLE IV

Similarly, two compositions having different ranges of a surfactant were prepared with the emulsion components as follows.

| Components | (a)wt. % | (b)wt. % |
|---|---|---|
| polymer (oxidized polyethylene) | 20 | 20 |
| NaOH | 2 | 2 |
| naphthalene sulfonate* (50% soln.) | 6 | 10 |
| Water | 72 | 68 |

*Petro AG Special, Petrochemicals Co.

EXAMPLE V

In an analogous manner, another emulsion was prepared with lauric acid as surfactant and having the following weight percentages.

| Components | wt. % |
|---|---|
| polymer (oxidized polyethylene | 20 |
| NaOH | 3 |
| Lauric Acid | 3 |

-continued

| Components | wt. % |
|---|---|
| Water | 74 |

EXAMPLE VI

Another emulsion (with a nonionic surfactant) was prepared having the component weight percentages as follows.

| Components | wt. % |
|---|---|
| polymer (oxidized polyethylene) | 20 |
| NaOH | 5 |
| linear, primary alcohol ethoxylate ($C_{12}$–$C_{15}$)* | 73 |

*Neodol 25-3S, Available from Shell Chemical

In a manner similar to emulsification of oxidized polyethylenes (as in Example I), stable emulsions utilizing polyethylene-acrylic acid copolymers were prepared from neutralized A-C580 polymer with equivalents of NaOH (1.3mgNaOH/g A-C580) added for neutralization. Examples VII and VIII characterize emulsions with neutralized polyethylene-acrylic acid copolymer and two different surfactants.

EXAMPLE VII

| Wt. % polymer | Wt. % Surfactant[1] | Wt. % Total Solids | pH |
|---|---|---|---|
| 10 | 3.3 | 11.8 | 12.1 |
| 10 | 8.3 | 13.4 | 11.8 |
| 10 | 16.6 | 16.1 | 12.1 |
| 10 | 33.3 | 22.0 | 11.2 |
| Wt. % polymer | Wt. % Surfactant[2] | Wt. % Total Solids | pH |
| 10 | 2.2 | 12.7 | 12.0 |
| 10 | 5.5 | 12.6 | 11.8 |
| 10 | 22.2 | 21.1 | 11.8 |

[1]sodium lauryl sulfate (30% solution)
[2]sodium dodecyl diphenyloxide disulfonate (45% solution)

EXAMPLE VIII

Ultramarine blue particles were dispersed with an oxidized polyethylene and sodium lauryl sulfate emulsion in the following manner. An emulsion (as in Example III, but with 5 wt. % surfactant) was used as the dispersing agent. To 1 g ultramarine blue in 31 g of water was added 28 g of the emulsion. Liquid hypochlorite bleach (having 0.2 wt. % NaOH and 3 wt. % cocobetaine, 30% solution, Lonzaine 12C, available form Lonza) was then slowly added to a total amount of 940 g with stirring. The polymer emulsion collapsed upon addition of the sodium hypochlorite solution, and the ultramarine blue was dispersed in the polymer matrix formed. The resulting composition was as follows:

| Component | Wt. % |
|---|---|
| Ultramarine blue | 0.10 |
| oxidized polyethylene | 0.56 |
| Sodium Lauryl Sulfate | 0.14 |
| Cocobetaine | 0.10 |
| Sodium Hypochlorite | 5.50 |
| Water | Remainder |

EXAMPLE IX

Ultramarine blue particle were dispersed with a polyethylene-acrylic acid copolymer and sodium dodecyl diphenyloxide disulfonate emulsion in the following manner. An emulsion (as in Example VII but with 1.8 wt. % sodium dodecyl diphenyloxide disulfonate) was used as the dispersing agent. To 28.5 g of this emulsion was added 0.5 g of ultramarine blue in 15 ml water. Then 456 g liquid hypochlorite bleach containing 0.2 wt. % NaOH was slowly added. Mild stirring during the addition produced a composition in accordance with the present invention which was stable at room temperature and at 37.8° C. The resulting composition was as follows:

| Components | Wt. % |
|---|---|
| Ultramarine Blue | 0.10 |
| Polyethylene Acrylic Acid copolymer | 0.57 |
| sodium dodecyl diphenyloxide disulfonate | 0.10 |
| NaOH | 0.20 |
| NaOCl | 5.50 |
| Water | Remainder |

This composition, which is a particularly preferred embodiment, had a pH of about 12.5–12.6.

While the invention has been described in connection with specific embodiments thereof, it will be understood that it is capable of further modification, and this application is intended to cover any variations, uses or adaptations of the invention following, in general, the principles of the invention and including such departures from the disclosure as come within the known or customary practice in the art to which the invention pertains and as may be applied to the essential features hereinbefore set forth, and as fall within the scope of the invention and the limits of the appended claims.

What is claimed is:

1. A bleaching and coloring composition comprising:
an aqueous solution, said aqueous solution having from about 1 wt. % to about 10 wt. % of a hypochlorite salt dissolved therein;
a particulate pigment, said particulate pigment in an amount of from about 0.005 wt. % to about 1 wt. % with respect to the aqueous solution, said particulate pigment being substantially water-insoluble and including an aluminosilicate, a zeolite, or a metal oxide; and,
a polymer dispersed in the aqueous solution, said polymer forming a matrix in which particles of said pigment are entrapped and stably suspended in the aqueous solution and being in an amount of from about 0.4 wt. % to about 5 wt. % with respect to the aqueous solution, the polymer being a modified polyethylene compound selected from the group consisting of oxidized polyethylene having a molecular weight between about 400 and 3,000, polyethylene-acrylic acid copolymers having a molecular weight between about 500 and 6,000, and mixture thereof, the polymer adapted to release the particulate pigment when the aqueous solution is sufficiently diluted.

2. The bleaching and coloring composition as in claim 1 wherein the oxidized polyethylene has an acid number from about 30 to about 120 and the polyethylene-acrylic acid copolymer has an acid number of from about 30 to about 70.

3. The bleaching and coloring composition as in claim 1 further comprising a nonionic or anionic surfactant.

4. The bleaching and coloring composition as in claim 3 wherein said surfactant is in an amount of from about 0.02 wt. % to about 5 wt. % with respect to said aqueous solution.

5. The bleaching and coloring composition as in claim 1 wherein:
the particles of said pigment are substantially evenly distributed throughout the matrix formed by said polymer and suspended in said aqueous solution by means of the matrix formed by said polymer.

6. The bleaching and coloring composition as in claim 1 wherein said particulate pigment includes ultramarine blue.

7. The bleaching and coloring composition as in claim 1 wherein said aqueous solution has a pH of at least about 11.

8. A liquid composition, useful for coloring fabrics, formed by the steps comprising:
admixing a quantity of molten polymer, said polymer consisting essentially of oxidized polyethylene having a molecular weight between about 400 and 3000 or polyethylene-acrylic acid copolymer having a molecular weight between about 500 and 6,000, with sufficient base to saponify and neutralize said oxidized polyethylene or to neutralize said polyethylene-acrylic acid copolymer;
contacting said molten polymer in the presence of an anionic or a nonionic surfactant with sufficient amounts of an aqueous solution to form an emulsion;
dispersing a quantity of particulate pigment including ultramarine blue in said emulsion, the pigment being in a weight ratio with respect to the emulsified polymer of from about 1:2 to about 1:8; and,
slowly adding a water soluble salt to the dispersed pigment and emulsified polymer at least until the emulsion collapses, wherein the polymer forms a matrix in which particles of the pigment are entrapped.

9. The liquid composition as in claim 8 wherein:
the water soluble salt is selected from the group consisting essentially of sodium carbonate, sodium sulfate, sodium chloride, sodium hypochlorite, calcium hypochlorite, lithium hypochlorite, calcium chloride, magnesium sulfate, aluminum sulfate, and mixtures thereof.

10. The liquid composition as in claim 8 wherein the water soluble salt includes sodium hypochlorite in an aqueous solvent.

11. A method for producing a bleaching and bluing composition comprising the steps of:
admixing a quantity of molten polymer, said polymer consisting essentially of oxidized polyethylene having a molecular weight between about 400 and 3,000 or polyethylene-acrylic acid copolymer having a molecular weight between about 500 to 6000, with sufficient base to saponify and neutralize said oxidized polyethylene or to neutralize said polyethylene-acrylic acid copolymer;
contacting said molten polymer in the presence of an anionic or a nonionic surfactant with sufficient of an aqueous solution to form an emulsion;
dispersing a quantity of particulate pigment including ultramarine blue in said emulsion, the ultramarine blue being in a weight ratio with respect to the emulsified polymer of from about 1:2 to about 1:8; and slowly adding sodium hypochlorite dissolved in an aqueous solution to the dispersed ultramarine blue and emulsified polymer until the emulsion collapses, wherein the polymer forms a matrix in which particles of the ultramarine blue are entrapped.

* * * * *